(12) United States Patent
Muntz et al.

(10) Patent No.: US 11,095,560 B2
(45) Date of Patent: Aug. 17, 2021

(54) TECHNOLOGIES FOR ETHERNET GATEWAY CONGESTION MANAGEMENT IN HIGH-PERFORMANCE COMPUTING ARCHITECTURES

(71) Applicant: Intel Corporation, Santa Clara, CA (US)

(72) Inventors: Gary Muntz, Lexington, MA (US); Robert Zak, Bolton, MA (US); Thomas Lovett, Portland, OR (US); Michael A. Parker, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 717 days.

(21) Appl. No.: 15/859,390

(22) Filed: Dec. 30, 2017

(65) Prior Publication Data

US 2019/0044864 A1 Feb. 7, 2019

(51) Int. Cl.
| | | |
|---|---|---|
| *H04L 12/803* | (2013.01) | |
| *H04L 12/66* | (2006.01) | |
| *H04L 12/801* | (2013.01) | |
| *H04L 12/851* | (2013.01) | |
| *H04L 12/825* | (2013.01) | |

(52) U.S. Cl.
CPC ............ *H04L 47/125* (2013.01); *H04L 12/66* (2013.01); *H04L 47/2441* (2013.01); *H04L 47/263* (2013.01); *H04L 47/33* (2013.01); *H04L 47/35* (2013.01)

(58) Field of Classification Search
CPC combination set(s) only.
See application file for complete search history.

(56) References Cited

U.S. PATENT DOCUMENTS

| | | | |
|---|---|---|---|
| 9,401,774 B1 * | 7/2016 | Mineo | H04L 41/12 |
| 2005/0157751 A1 * | 7/2005 | Rabie | H04L 12/56 370/466 |
| 2014/0169170 A1 * | 6/2014 | Almog | H04L 49/604 370/235 |
| 2016/0006579 A1 * | 1/2016 | Lamb | H04L 12/4625 370/254 |
| 2016/0373362 A1 * | 12/2016 | Cheng | H04L 45/64 |

* cited by examiner

*Primary Examiner* — Walli Z Butt
*Assistant Examiner* — Thad N Defauw
(74) *Attorney, Agent, or Firm* — Compass IP Law PC

(57) ABSTRACT

Technologies for Ethernet gateway congestion management in HPC architectures include a high-performance computing (HPC) switch with an Ethernet gateway that is configured to receive an HPC packet from an HPC fabric via a virtual lane (VL) of the Ethernet gateway. The Ethernet gateway is further configured to determine whether the HPC packet corresponds to a backward error correction notification (BECN), identify one or more priority code points (PCPs) of the HPC packet corresponding to a BECN as a function of the VL on which the HPC packet was received, and generate an Ethernet priority-based flow control (PFC) frame that includes the one or more identified PCPs in a header of the Ethernet PFC frame. Additionally, the Ethernet gateway is configured to transmit the Ethernet PFC frame to an Ethernet fabric as a function of the one or more identified PCPs. Other embodiments are described herein.

25 Claims, 5 Drawing Sheets

TECHNOLOGIES FOR ETHERNET GATEWAY CONGESTION MANAGEMENT IN HIGH-PERFORMANCE COMPUTING ARCHITECTURES

BACKGROUND

Modern computing devices have become ubiquitous tools for personal, business, and social uses. As such, many modern computing devices are capable of connecting to various data networks, including the Internet, to transmit and receive data communications over the various data networks at varying rates of speed. To facilitate communications to/from endpoint computing devices, the data networks typically include one or more network computing devices (e.g., compute servers, storage servers, etc.) to route communications (e.g., via switches, routers, etc.) that enter/exit a network (e.g., north-south network traffic) and between network computing devices in the network (e.g., east-west network traffic).

Certain compute intensive and/or latency sensitive applications, such as enterprise cloud-based applications (e.g., software as a service (SaaS) applications), data mining applications, data-driven modeling applications, scientific computation problem solving applications, etc., can benefit from being processed on specialized, high-performance computing (HPC) devices typically found in complex, large-scale computing environments (e.g., HPC environments, cloud computing environments, etc.). Such large-scale computing environments can include tens of hundreds to tens of thousands of multi-processor/multi-core network computing devices connected via high-speed, low-level interconnects. The high-speed interconnects in HPC environments typically include Ethernet-based interconnects, such as 100 Gigabit Ethernet (100 GigE) interconnects, or HPC system optimized interconnects (i.e., supporting very high throughput and very low latency), such as InfiniBand or Intel® Omni-Path interconnects.

Further, some large-scale computing environments can include both HPC-optimized interconnects and Ethernet interconnects, such as in telecommunication environments in which a carrier's network physically links with network computing devices of another network not belonging to the carrier (e.g., a customer's network, another carrier's network, etc.). Accordingly, various technologies, such as an HPC to Ethernet gateway, have been implemented which are capable of facilitating the transmission of network packets between the HPC and Ethernet fabrics. However, the network management support available from present technologies tends to lack sufficient support features relative to network requirements.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
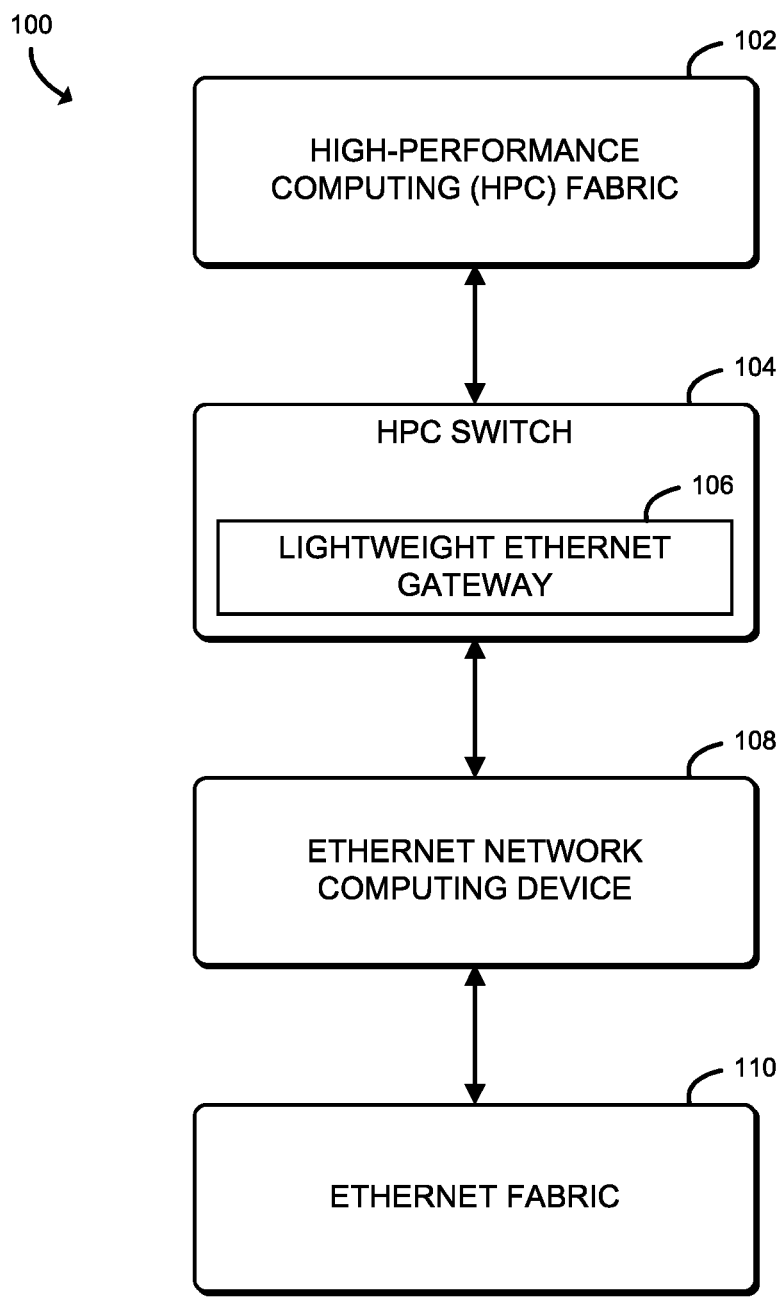
FIG. 1 is a simplified block diagram of at least one embodiment of a system for Ethernet gateway congestion management in high-performance computing (HPC) architectures that includes an HPC switch communicatively coupled to an Ethernet network computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for Ethernet gateway congestion management in high-performance computing (HPC) architectures includes an HPC switch 104 and an Ethernet network computing device 108. As illustratively shown, the HPC switch 104 is communicatively coupled to the HPC fabric 102 and the Ethernet network computing device 108, and the Ethernet network computing device 108 is communicatively coupled to the HPC switch 104 and the Ethernet fabric 110. The HPC fabric 102 includes pools of HPC optimized compute and storage resources supporting very high throughput and very low latency. The Ethernet fabric 110 includes pools of Ethernet-based compute and storage resources supporting resilient, high-performance connectivity between the Ethernet-based compute and storage resources. As network traffic passes through either the HPC fabric 102 or the Ethernet fabric 110, network congestion can result. Network congestion typically results in a reduced quality of service which occurs as a result of a network node or link carrying more data than it can handle, which can result in queueing delay, packet loss, the blocking of new connections, and various other undesirable results.

It should be appreciated that the protocols for managing network congestion the HPC fabric 102 are distinct from those of the Ethernet fabric 110. Accordingly, each of the HPC fabric 102 and the Ethernet fabric 110 has implemented different mechanisms to address the issue of network congestion. For example, the HPC fabric 102 exposes a single port containing many virtual lanes (VLs), each of which has an independent credit loop. The HPC flow control includes an Explicit Congestion Notification (ECN) feature, in which a pair of bits in the header of each packet may carry a Forward ECN (FECN) or a Backward ECN (BECN). An FECN indicates the packet passed through a point of high contention in the HPC fabric 102, whereas a BECN indicates congestion in the reverse direction, to notify the sender into a congestion point to throttle down its transmission bandwidth along a particular path. Typically, an endpoint on the HPC fabric 102 converts a received FECN into a BECN in the opposite direction. Unlike the HPC flow control, the Ethernet flow control uses a link-level flow control mechanism referred to as priority-based flow control (PFC), for which an Ethernet port provides several flow control domains (i.e., classifications for managing the flow of network traffic and providing quality of service (QoS)) called priority code points (PCPs) using PFC.

The illustrative HPC switch 104 includes an Ethernet gateway, referred to herein as a lightweight Ethernet gateway (LWEG) 106. It should be appreciated that the LWEG 106 is referred to herein as "lightweight" as a result of the form factor being physically small enough to fit on-die in a high-radix HPC switch. As such, traditional techniques for Ethernet PFC or HPC congestion management endpoints, which can require significant buffering due to the large size of tables required to store the states and/or to respond to or generate flow control signals, cannot fit in the LWEG 106 due to size constraints. Further, marking to a specific source or synthesizing a packet indicative of the congestion (e.g., a congestion notification packet) for transmission to the congestion source can be expensive to support in hardware and/or injects delay and additional bandwidth into an already congested stream, which can result bandwidth and/or latency contention issues.

In use, unlike conventional Ethernet gateways which terminate congestion management mechanisms for each fabric (i.e., the HPC HFI terminates the congestion management mechanisms of the HPC fabric and the NIC terminates the Ethernet congestion management mechanisms), the LWEG 106 translates between the HPC and Ethernet domains directly. To do so, the LWEG 106 translates inbound congestion indicative packets received from either the HPC fabric 102 or the Ethernet network computing device 108 and outputs translated congestion indicative packets such that the receiving fabric can respond to the congestion accordingly. For example, the LWEG 106 is configured to convert from PFC flow-off to HPC BECN, and vice versa, through VL-to-PCP maps and PCP-to-VL maps, respectively.

As such, unlike present HPC to Ethernet gateways which only support Ethernet link-level flow control and do not have support as described herein for HPC congestion management (i.e., by directly converting between Ethernet PFC and HPC BECN), the LWEG 106 can provide flow control translation while realizing latency and bandwidth efficiencies. It should be appreciated that PFC frames and BECNs signal that a remote transmitter should temporarily reduce its rate of network traffic sent toward the LWEG 106, so the PFC frames and BECNs are fundamentally similar. However, because PFC frames are sent periodically and FECNs/BECNs are asynchronous, the LWEG 106 is additionally configured to adapt the translation for both directions (i.e., Ethernet fabric 110 to HPC fabric 102 and HPC fabric 102 to Ethernet fabric 110).

Figure 2:
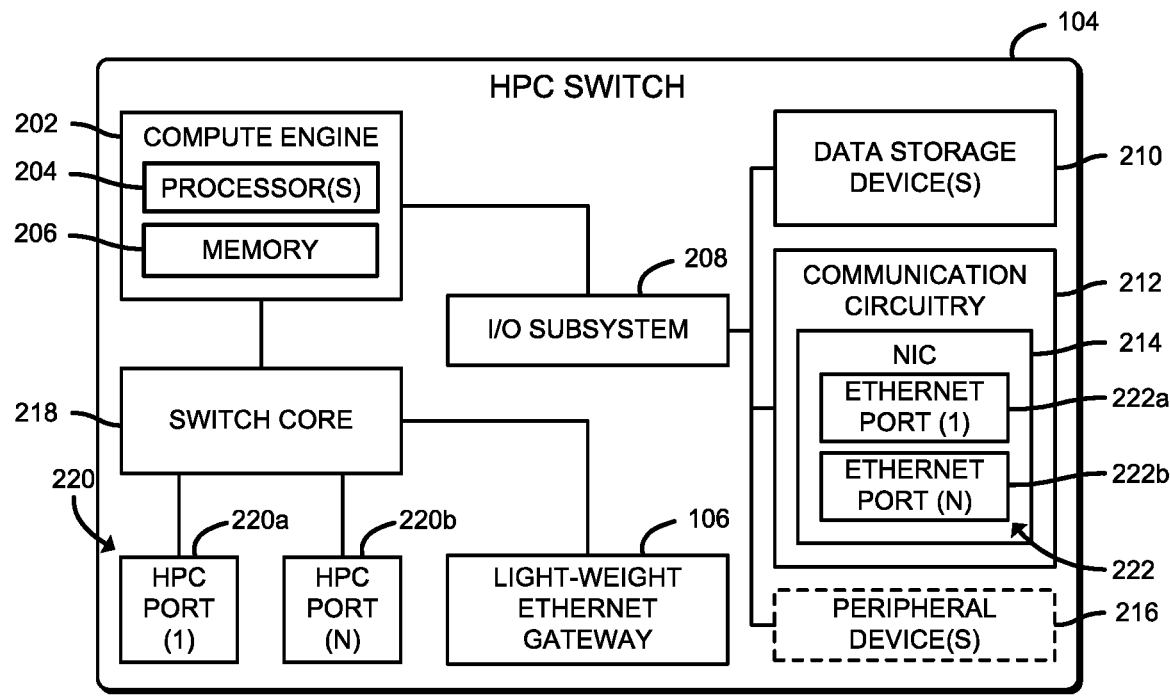
FIG. 2 is a simplified block diagram of at least one embodiment of an Ethernet network computing device of the system of FIG. 1.
Figure 3:
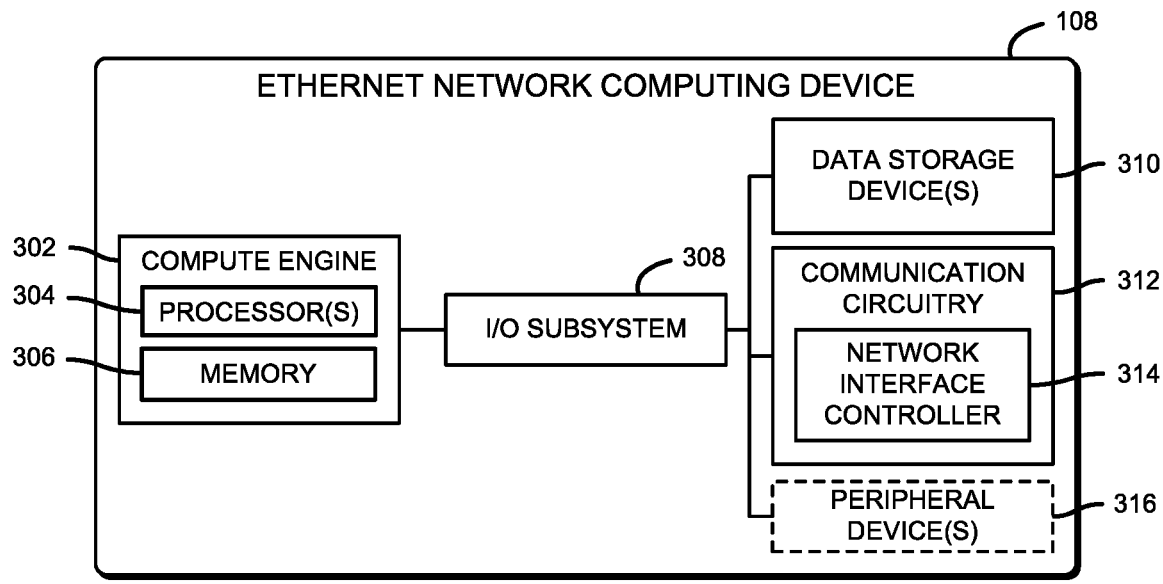
FIG. 3 is a simplified block diagram of at least one embodiment of an HPC switch of the system of FIG. 1.

The HPC switch 104 may be embodied as any type of switch device optimized for an HPC architecture, such as an InfiniBand switch or an Intel® Omni-Path switch, which is capable of performing the functions described herein. Referring now to FIG. 2, the illustrative HPC switch 104 includes a compute engine 202, an input/output a (I/O) subsystem 208, one or more data storage devices 210, communication circuitry 212, a switch core, multiple HPC ports 220, and, in some embodiments, one or more peripheral devices 216. Of course, in other embodiments, the HPC switch 104 may include other or additional components, such as those commonly found in a switch (e.g., a power supply, cooling component(s), etc.). Additionally, in some embodiments, one or more of the illustrative components may be incorporated in, or otherwise form a portion of, another component.

The compute engine 202 may be embodied as any type of device or collection of devices capable of performing various compute functions described below. In some embodiments, the compute engine 202 may be embodied as a single device such as an integrated circuit, an embedded system, an FPGA, a system-on-a-chip (SoC), or other integrated system or device. Additionally, in some embodiments, the compute engine 202 includes or may otherwise be embodied as one or more processors 204 and a memory 206. The processor(s) 204 may be embodied as any type of processor capable of performing the functions described herein. For example, the processor(s) 204 may be embodied as one or more single or multi-core processors, a microcontroller, or other processor or processing/controlling circuit. In some embodiments, the processor(s) 204 may be embodied as, include, or otherwise be coupled to an FPGA, an application specific integrated circuit (ASIC), reconfigurable hardware or hardware circuitry, or other specialized hardware to facilitate performance of the functions described herein.

The memory 206 may be embodied as any type of volatile (e.g., dynamic random access memory (DRAM), etc.) or non-volatile memory or data storage capable of performing the functions described herein. It should be appreciated that the memory 206 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 206 may be integrated into the processor(s) 204. In operation, the memory 206 may store various software and data used during operation such as job request data, kernel map data, telemetry data, applications, programs, libraries, and drivers.

The compute engine 202 is communicatively coupled to other components of the HPC switch 104 via the I/O subsystem 208, which may be embodied as circuitry and/or components to facilitate input/output operations with the compute engine 202 (e.g., with the processor 204 and/or the memory 206) and other components of the HPC switch 104. For example, the I/O subsystem 208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 208 may form a portion of a SoC and be incorporated, along with one or more of the processor(s) 204, the memory 206, and other components of the HPC switch 104, into the compute engine 202.

Each of the one or more data storage devices 210 may be embodied as any type of devices configured for short-term or long-term storage of data such as, for example, memory devices and circuits, memory cards, hard disk drives, solid-state drives, or other data storage devices. Each data storage device 210 may include a system partition that stores data and firmware code for the data storage device 210. Additionally, each data storage device 210 may also include an operating system partition that stores data files and executables for an operating system.

The communication circuitry 212 may be embodied as any communication circuit, device, or collection thereof, capable of enabling network communications between the HPC switch 104 and another device (e.g., the Ethernet network computing device 108, a computing device of the HPC fabric 102, etc.) via one or more virtual or physical interconnects. Accordingly, the communication circuitry 212 may be configured to use any one or more communication technologies (e.g., wired or wireless communications) and associated protocols (e.g., Ethernet, Bluetooth®, Wi-Fi®, WiMAX, etc.) to effect such communication. The illustrative communication circuitry 212 includes a NIC 214, which may also be referred to as a smart NIC or an intelligent/smart host fabric interface (HFI).

The NIC 214 may be embodied as one or more add-in boards, daughter cards, network interface cards, controller chips, chipsets, or other devices that may be used by the HPC switch 104 to transmit/receive network communications to/from another device. Accordingly, the NIC 214 includes one or more Ethernet ports 222 for transmitting and receiving Ethernet frames (i.e., Ethernet packets) to/from the Ethernet fabric (e.g., the Ethernet fabric 110 of FIG. 1) via an Ethernet network computing device (e.g., the Ethernet network computing device 108 of FIG. 1). The illustrative Ethernet ports 222 include a first Ethernet port 222 designated as Ethernet port (1) 222a and a second Ethernet port 222 designated as Ethernet port (N) 222b, wherein, wherein "N" is a positive integer which represents the "Nth" Ethernet port 222. It should be appreciated that the HPC switch 104 typically has multiple Ethernet ports 222.

The peripheral device(s) 216 may include any type of device that is usable to input information into the HPC switch 104 and/or receive information from the HPC switch 104. The peripheral devices 216 may be embodied as any auxiliary device usable to input information into the HPC switch 104, such as a keyboard, a mouse, a microphone, a barcode reader, an image scanner, etc., or output information from the HPC switch 104, such as a display, a speaker, graphics circuitry, a printer, a projector, etc. It should be appreciated that, in some embodiments, one or more of the peripheral devices 216 may function as both an input device and an output device (e.g., a touchscreen display, a digitizer on top of a display screen, etc.). It should be further appreciated that the types of peripheral devices 216 connected to the HPC switch 104 may depend on, for example, the type and/or intended use of the HPC switch 104. Additionally or alternatively, in some embodiments, the peripheral devices 216 may include one or more ports, such as a USB port, for example, for connecting external peripheral devices to the HPC switch 104.

The switch core 218 is configured to enable the flow of network packets between the HPC fabric and the Ethernet fabric. Accordingly, the HPC ports 220 are configured to connect directly to an HPC fabric. The illustrative HPC ports 220 include a first HPC port 220 designated as HPC port (1) 220a and a second HPC port 220 designated as HPC port (N) 220b, wherein, wherein "N" is a positive integer which represents the "Nth" HPC port 220. It should be appreciated that the HPC switch 104 typically has multiple HPC ports 220. As such, the LWEG 106 is configured to behave as if it were another HPC port from the perspective of the switch core 218, but the external interface is Ethernet rather than HPC. As such, the switch core 218, the HPC ports 220, and other components of the HPC switch 104 may use various interconnects (e.g., InfiniBand or Intel® Omni-Path interconnects) for transferring data throughout the HPC switch 104.

Referring back to FIG. 1, the Ethernet network computing device 108 may be embodied as any type of Ethernet-compatible network computing device capable of performing the functions described herein, such as an Ethernet switch, an Ethernet router, etc. As shown in FIG. 2, similar to the illustrative HPC switch 104 of FIG. 2, the illustrative Ethernet network computing device 108 includes a compute engine 302 with one or more processors 304 and a memory 306, an I/O subsystem 308, one or more data storage devices 310, communication circuitry 312 that includes a NIC 314, and, in some embodiments, one or more peripheral devices 316. As such, further descriptions of the similar or like components are not repeated herein for clarity of the description with the understanding that the description of the corresponding components provided above in regard to the illustrative HPC switch 104 of FIG. 2 applies equally to the corresponding components of the illustrative Ethernet network computing device 108. Of course, it should be appreciated that the Ethernet network computing device 108 may include additional and/or alternative components, such as those commonly found in a server, router, switch, or other network device, depending on the embodiment. Additionally, in some embodiments, one or more of the illustrative components may be incorporated in, or otherwise form a portion of, another component.

Figure 4:
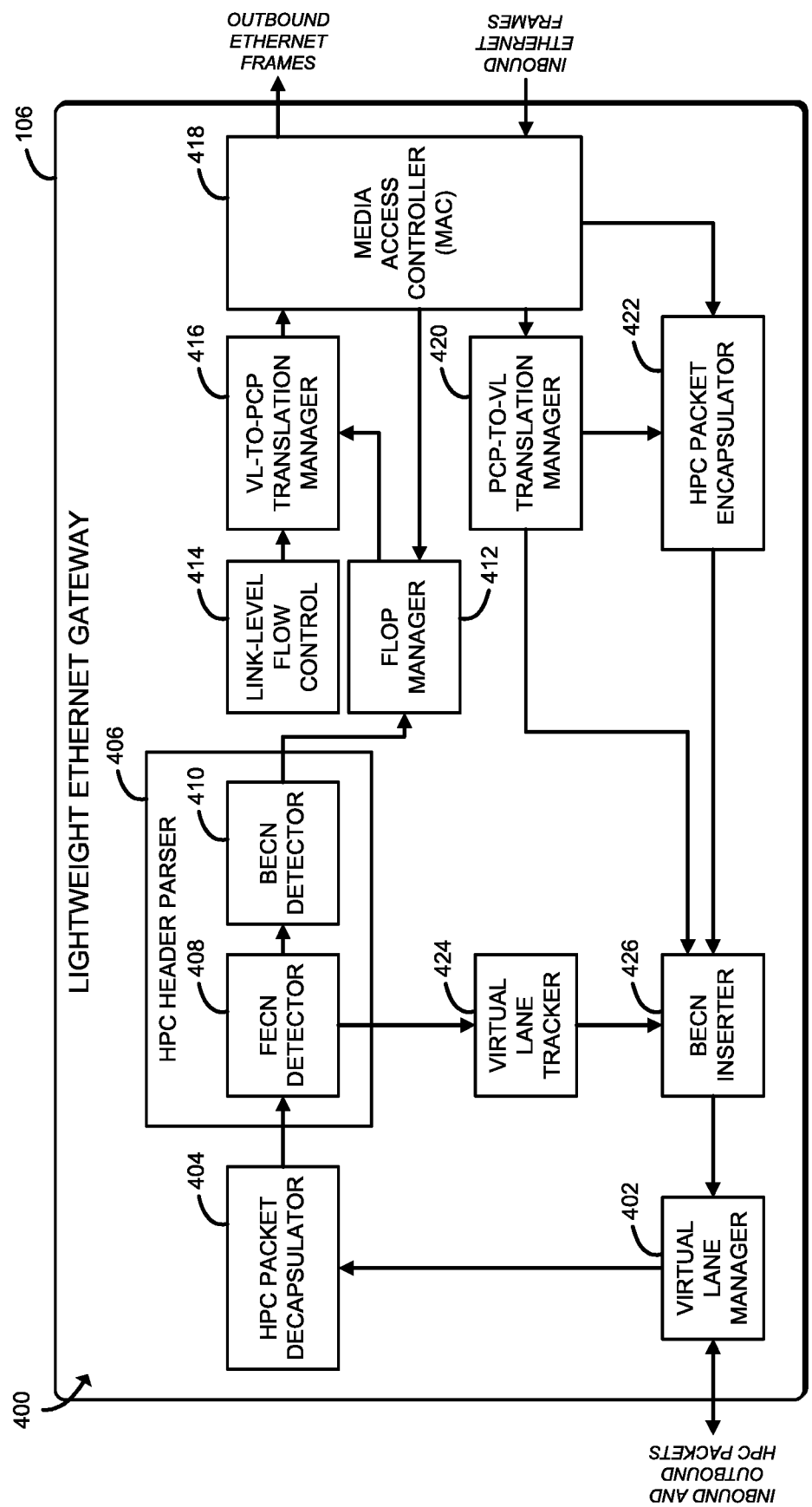
FIG. 4 is a simplified block diagram of at least one embodiment of an environment of a lightweight Ethernet gateway of the HPC switch of FIGS. 1 and 2.

Referring now to FIG. 4, in use, the LWEG 106 of the HPC switch 104 establishes an environment 400 during operation. The illustrative environment 400 includes various components which may be embodied as hardware, firmware, software, or a combination thereof. As such, in some embodiments, one or more of the components of the environment 200 may be embodied as circuitry or collection of electrical devices. It should be appreciated that, in such embodiments, one or more of the components may form a portion of one or more of the compute engine 202, the I/O subsystem 208, the communication circuitry 106, and/or other components of the HPC switch 104.

Additionally, in some embodiments, one or more of the illustrative components may form a portion of another component and/or one or more of the illustrative components may be independent of one another. Further, in some embodiments, one or more of the components of the environment 400 may be embodied as virtualized hardware components or emulated architecture, which may be established and maintained by the compute engine 202 or other components of the HPC switch 104. It should be appreciated that the LWEG 106 may include other components, sub-components, modules, sub-modules, logic, sub-logic, and/or devices commonly found in a computing device, which are not illustrated in FIG. 4 for clarity of the description.

In the illustrative environment 400, the LWEG 106 includes a VL manager 402, an HPC packet decapsulator 404, an HPC header parser 406, a flop manager 412, a link-level flow control 414, a VL-to-PCP translation manager 416, a media access controller (MAC) 418, a PCP-to-VL translation manager 420, an HPC packet encapsulator 422, a VL tracker 424, and a BECN inserter 426. As described previously, the LWEG 106 is configured to translate BECN information in HPC packet headers received by the LWEG 106 from the HPC fabric 102 into Ethernet PFC frames. Additionally, as also described previously, the LWEG 106 is configured to receive FECN information from decapsulated HPC packets and translate this to BECN in the encapsulation path, so as to trigger a short-term reduction in the load into the congestion point that created the FECN HPC packet.

To do so, the VL manager 402 is configured to receive inbound HPC packets from the HPC fabric 102 and transmit outbound HPC packets to the HPC fabric 102 via a corresponding bi-directional VL at the VL manager 402. The VL manager 402 is additionally configured to forward received HPC packets to the HPC packet decapsulator 404. The HPC packet decapsulator 404 may be configured to decapsulate the HPC packet into one or more first-in-first-out (FIFO) queues, per VL. The HPC packet decapsulator 404 is additionally configured to forward the decapsulated to the HPC header parser 406.

The HPC header parser 406 is configured to determine whether the decapsulated HPC packet (i.e., received from the HPC packet decapsulator 404) corresponds to an FECN, a BECN, neither, or both. It should be appreciated that each HPC packet received includes a payload (i.e., data), an Ethernet frame, and an extra header on which allows the HPC packet to tunnel through the HPC fabric (e.g., the HPC fabric 102 of FIG. 1). This HPC header includes 2 independent bits, one each for FECN and BECN. As such, any given HPC packet may have represent an FECN, a BECN, neither an FECN or a BECN, or both an FECN and a BECN.

To do so, the illustrative HPC header parser 406 includes an FECN detector 408 and a BECN detector 410. The FECN detector 408 is configured to determine whether the received HPC packet corresponds to an FECN. The BECN detector 410 is configured to determine whether the received HPC packet corresponds to a BECN. To do so, each of the FECN detector 408 and the BECN detector 410 is configured to determine whether the received HPC packet corresponds to a BECN or an FECN as a function of a corresponding bit in a header of the received HPC packet.

The flop manager 412 is configured to receive the BECN on a per-VL basis and hold the BECN until the MAC 418 provides a signal to clear the flop (e.g., at the end of a PFC frame timeout cycle) indicating an Ethernet PFC frame has been sent to the Ethernet fabric (e.g., the Ethernet fabric 110 via the Ethernet network computing device 108). Accordingly, the flop manager 412 is additionally configured clear the associated flop upon receipt of a signal from the MAC 418 which indicates the end of a PFC frame timeout cycle has been reached. Accordingly, it should be appreciated that a PFC frame timeout (i.e., a PFC pause) is active for a period of time over which thousands of packets can be received.

The link-level flow control 414 is configured to apply the other logic driving PFC. The VL-to-PCP translation manager 416 is configured to perform a logical operation (e.g., an OR operation) on an output of the flop manager 412 and an output of the link-level flow controller 414 to drive each VL based on the applicable BECN state (i.e., as indicated by the flop manager 412) or the link-level PFC logic (i.e., as provided by the link-level flow controller 414). Accordingly, the VL-to-PCP translation manager 416 is configured to map the result of the logical operation to one or more PCPs which drive the VL associated with the BECN.

The MAC 418 is configured to receive translated Ethernet PFC frames, insert the appropriate PCP(s), and transmit the Ethernet PFC frames to the Ethernet fabric (e.g., via the Ethernet network computing device 408). For example, in illustrative path for transmitting a PFC frame, an HPC packet arrives for decapsulation with a BECN in its HPC header. Accordingly, the BECN is mapped from its VL to the PCP(s) driving that VL. The affected PCP(s) are sent to the MAC 418, via the flop manager 412, to signal a PFC to the MAC 418. Upon receipt, the MAC 418 synthesizes a PFC frame, including the current flow control state for all 8 PCPs, and transmits it to the Ethernet fabric (e.g., the Ethernet fabric 102 of FIG. 1). Additionally, the MAC sends a signal which clears the flop manager 412. As described previously, the LWEG 106 is configured to translate Ethernet PFC frames received at the LWEG 106 from the Ethernet fabric 110 (e.g., via the Ethernet network computing device 108). Accordingly, the MAC 418 is additionally configured to receive inbound Ethernet PFC frames from the Ethernet fabric 110.

The PCP-to-VL translation manager 420 is configured to map each received Ethernet PFC frame to one or more corresponding VLs (e.g., as a function of the context of the network traffic type/class associated with the received Ethernet PFC frame). The PCP-to-VL translation manager 420 is additionally configured to forward the map result output signals to the HPC packet encapsulator 422. The HPC packet encapsulator 422 is configured to encapsulate the output signal as an HPC packet and forward the HPC packet to the BECN inserter 426. It should be appreciated that the HPC packet encapsulator 422 is configured to encapsulate each Ethernet frame received and processed by the MAC 418 on more than one VL, while the BECNs translated from PFC frames are sent 'around' this per-packet encapsulation and wait for an HPC packet on the proper VL to appear.

The BECN inserter 426 is configured to set the BECN field in a header of the HPC packets sent to the affected VL from the LWEG 106. In other words, the FECN-to-BECN path translates a single FECN into a single BECN. The VL tracker 424 is configured to receive an indication as to which inbound HPC packets have been identified as FECNs by the FECN detector 408 and forward the FECNs to the BECN inserter 426. Accordingly, the BECN inserter 426 is additionally configured to convert the received HPC packets which have been identified as carrying FECN to BECN designations. The BECN inserter 426 is further configured to forward the BECN designated HPC packets to the VL manager 402.

Figure 5:
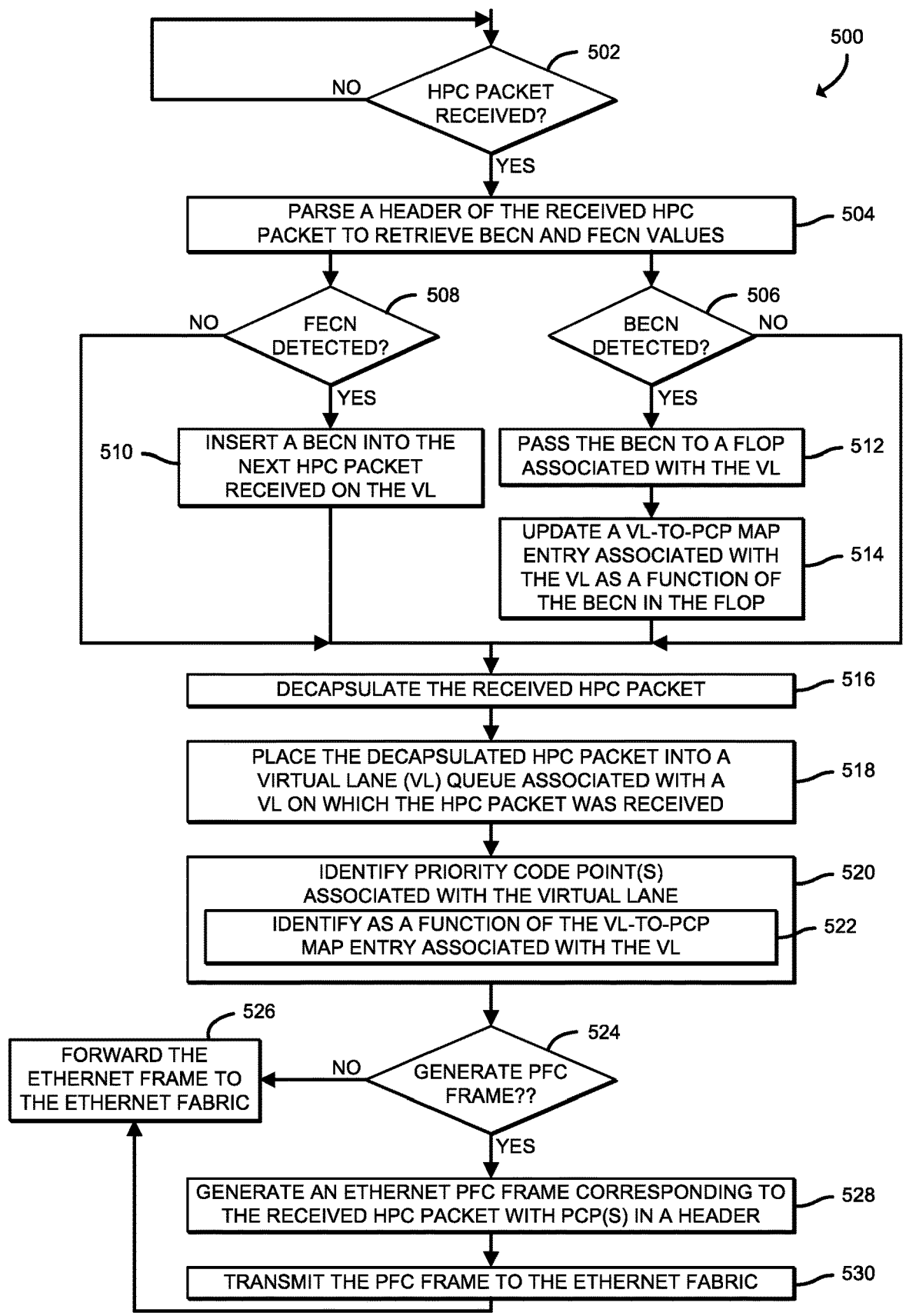
FIG. 5 is a simplified flow diagram of at least one embodiment of a method for translating a received HPC packet that may be executed by the lightweight Ethernet gateway of FIG. 4.

Referring now to FIG. 5, a method 500 for translating a received HPC packet which may be executed by the HPC switch 104, or more particularly by the LWEG 106 of the HPC switch 104. The method 500 begins with block 502, in which the LWEG 106 determines whether an HPC packet has been received from the HPC fabric 102 via a VL (e.g., a bi-directional virtual lane). If so, the method 500 advances to block 504, in which the LWEG 106 parses a header of the received HPC packet to retrieve BECN and FECN values from their associated fields in the header. In other words, the LWEG 106 parses the header of the received HPC packet to determine whether the header indicates the HPC packet corresponds to a BECN or an FECN (e.g., via the corresponding bits of the header)

In block 506, the LWEG 106 determines whether the corresponding BECN header bit indicates the HPC packet has been identified as a BECN. If so, the method branches to block 512, which is described below; otherwise, the method 500 branches to block 508, in which the LWEG 106 determines whether the corresponding FECN header bit indicates the HPC packet has been identified as an FECN. If not, the method 500 jumps to block 516, which is described below; otherwise, the method advances to block 510. In block 510, the LWEG 106 converts the FECN indicative HPC packet to a BECN indicative HPC packet (i.e., marks/sets the corresponding BECN bit to indicate the HPC packet corresponds to a BECN), before the method 500 advances to block 516, which as noted previously is described below. Accordingly, the LWEG 106 can then transmit the converted BECN indicative HPC packet to the HPC fabric 102 along the VL on which the FECN indicative HPC packet was received.

As noted previously, if the LWEG 106 determines that the received HPC packet has been identified as a BECN in block 506, the method 500 branches to block 512. In block 512, the LWEG 106 passes the BECN to a flop associated with the VL. In block 514, the LWEG 106 updates an entry of a VL-to-PCP map that is associated with the VL on which the HPC packet was received as a function of the BECN in the flop associated with the VL. To do so, the LWEG 106 is configured to perform a logic operation (e.g., an OR operation) on the output of the flop with other PFC logic to map the applicable VL to PCP(s) as a function of either the PFC logic or the BECN. Additionally, the LWEG 106 is configured to map the output of the logic operation to one or more corresponding PCPs driving the HPC VLs associated with the BECN. As described previously, whether or not the received HPC packet has been identified as an FECN and/or a BECN in blocks 506 and 508, the method 500 proceeds to block 516. In block 516, the LWEG 106 decapsulates the received HPC packet. In block 518, the LWEG 106 places the decapsulated portions of the received HPC packet into a per-VL queue.

In block 520, the LWEG 106 identifies one or more PCPs associated with the VL. To do so, in block 522, the LWEG 106 identifies the PCP(s) as a function of the updated VL-to-PCP map entry associated with the VL. Accordingly, it should be appreciated that the LWEG 106 maps the received HPC packet based on a context of the network traffic associated with the congestion (i.e., either the presence of the BECN or link-level PFC logic in the absence of the BECN). In block 524, the LWEG 106, or more particularly a MAC (e.g., the MAC 418 of FIG. 4), determines whether to generate a PFC frame. If not, the method 500 branches to block 526, in which the LWEG 106 forwards the Ethernet from of the PFC frame to the Ethernet fabric. Otherwise, if the LWEG 106 determines that a PFC frame is to be generated, the method 500 advances to block 528. In block 528, the LWEG 106 generates an Ethernet PFC frame corresponding to the received HPC packet, which includes the one or more identified PCP(s) in a header of the Ethernet PFC frame. In block 530, the LWEG 106 transmits the generated Ethernet PFC frame to the Ethernet fabric 110 (e.g., via the Ethernet network computing device 108) before the method 500 advances to block 526, in which the LWEG 106 forwards the Ethernet from of the PFC frame to the Ethernet fabric.

Figure 6:
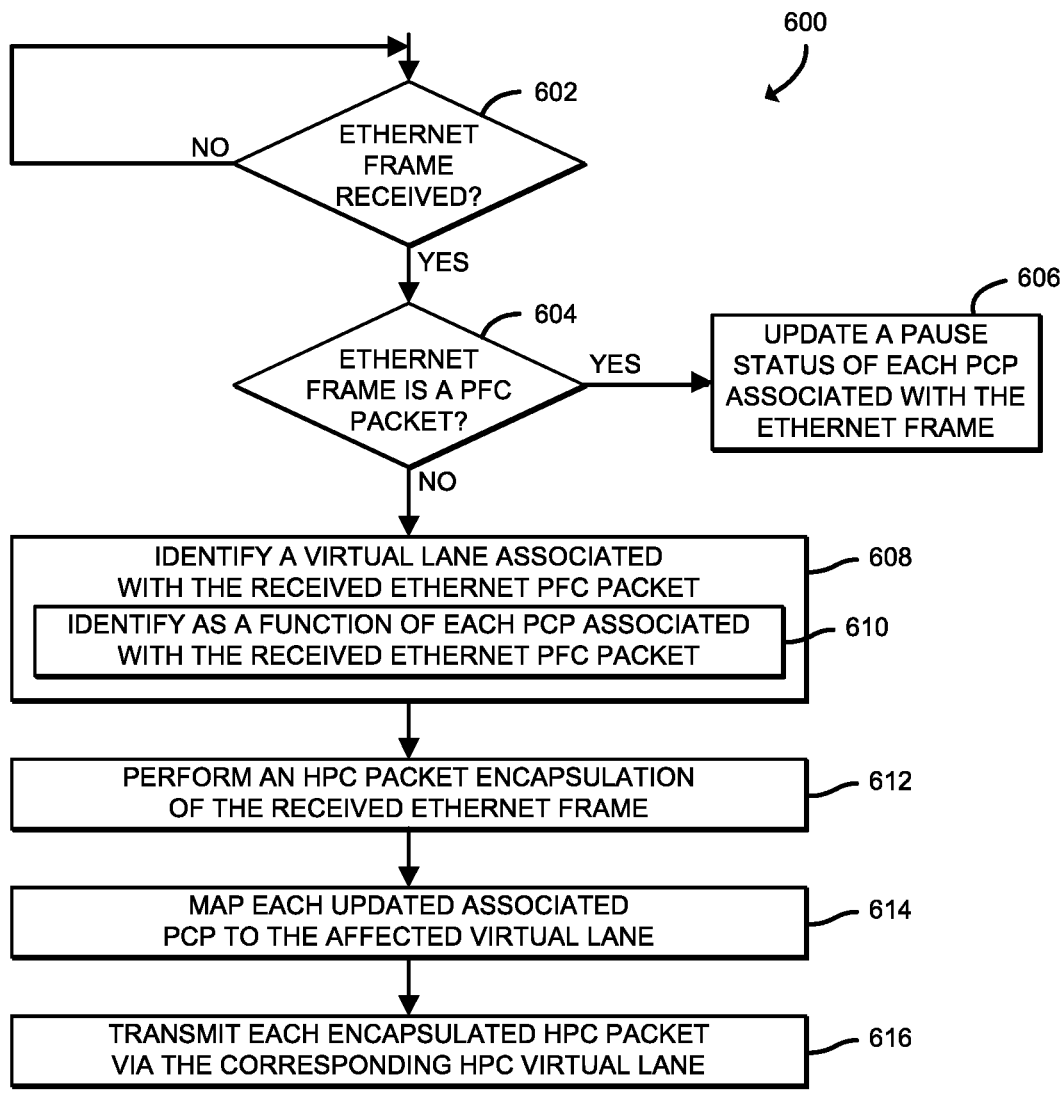
FIG. 6 is a simplified block diagram of at least one embodiment of a method for translating a received Ethernet frame that may be executed by the lightweight Ethernet gateway of FIG. 4.

Referring now to FIG. 6, a method 600 for managing a received Ethernet frame which may be executed by the HPC switch 104, or more particularly by the LWEG 106 of the HPC switch 104. The method 600 begins with block 602, in which the LWEG 106 determines whether an Ethernet frame has been received from the Ethernet fabric 110 (e.g., via the Ethernet network computing device 108). If so, the method 600 advances to block 604, in which the LWEG 106 determines whether the Ethernet frame corresponds to a PFC packet. If so, the method 600 branches to block 606, in which the LWEG 106 updates a pause status of each associated PCP. Otherwise, the method 600 branches to block 608, in which the LWEG 106 identifies a VL associated with the received Ethernet frame (e.g., based on a context of the network traffic associated with the congestion).

To do so, for example in block 610, the LWEG 106 may identify the one or more VLs as a function of one or more PCPs associated with the received Ethernet frame. In other words, the LWEG 106 may identify one or more PCPs of the received Ethernet frame (e.g., via a corresponding PCP field in a header of the Ethernet frame) and perform a lookup operation (i.e., using the PCP(s)) on a PCP-to-VL map to identify the corresponding VL. It should be appreciated that typically each HPC packet destined for the HPC fabric (i.e., not a PFC frame) has a virtual local area network (VLAN) tag with priority bits which are mapped to a VL. However, if no VLAN tag is present, a default VL may be configured. Accordingly, each VLAN tag maps to a single VL, including the untagged case, which also maps to a single VL. In other words, VL configuration entries in the map may point to a given VL, while one or more VLs may map to a PCP. In block 612, the LWEG 106 performs an HPC packet encapsulation on the received Ethernet PFC packet as a function of the identified VL. In block 614, the LWEG 106 maps each updated associated PCP to the VL. In block 616, the LWEG 106 transmits each encapsulated HPC packet via the corresponding VL.

EXAMPLES

Illustrative examples of the technologies disclosed herein are provided below. An embodiment of the technologies may include any one or more, and any combination of, the examples described below.

Example 1 includes a high-performance computing (HPC) switch for Ethernet gateway congestion management in HPC architectures, the HPC switch comprising a compute engine; and an Ethernet gateway to receive an HPC packet from an HPC fabric via a virtual lane (VL) of the Ethernet gateway; determine whether the HPC packet corresponds to a backward error correction notification (BECN); identify, in response to a determination that the HPC packet corresponds to a BECN, one or more priority code points (PCPs) as a function of the VL on which the HPC packet was received; generate an Ethernet priority-based flow control (PFC) frame that includes the one or more identified PCPs in a header of the Ethernet PFC frame; and transmit the Ethernet PFC frame to an Ethernet fabric as a function of the one or more identified PCPs.

Example 2 includes the subject matter of Example 1, and wherein to determine whether the HPC packet indicates the HPC packet corresponds to the BECN comprises to check a BECN bit in a header of the HPC packet.

Example 3 includes the subject matter of any of Examples 1 and 2, and wherein the Ethernet gateway is further to determine whether the HPC packet corresponds to a forward error correction notification (FECN).

Example 4 includes the subject matter of any of Examples 1-3, and wherein to determine whether the HPC packet indicates the HPC packet corresponds to the FECN comprises to check an FECN bit in a header of the HPC packet.

Example 5 includes the subject matter of any of Examples 1-4, and wherein the Ethernet gateway is further to transmit, in response to a determination that the HPC packet indicates the HPC packet corresponds to the FECN, another HPC packet which corresponds to another BECN on the VL on which the HPC packet that corresponds to the FECN was received.

Example 6 includes the subject matter of any of Examples 1-5, and wherein the Ethernet gateway is further to update a corresponding PCP field in the header of the Ethernet PFC frame based on the one or more identified PCPs.

Example 7 includes the subject matter of any of Examples 1-6, and wherein the Ethernet gateway is further to decapsulate the received HPC packet into one or more decapsulated portions; and place the one or more decapsulated portions of the received HPC packet into a VL queue associated with the VL on which the HPC packet was received.

Example 8 includes the subject matter of any of Examples 1-7, and wherein the Ethernet gateway is further to pass the BECN to a flop associated with the VL; and update a VL-to-PCP map entry associated with the VL as a function of the BECN, wherein to identify the one or more PCPs comprises to identify the one or more PCPs as a function of the updated VL-to-PCP map entry.

Example 9 includes the subject matter of any of Examples 1-8, and wherein the Ethernet gateway is further to receive an Ethernet frame from an Ethernet fabric; identify one or more outbound VLs associated with the Ethernet frame; determine whether the Ethernet frame corresponds to a PFC packet; identify each PCP associated with the Ethernet frame; and update, in response to a determination that the Ethernet frame corresponds to the PFC packet, a pause state of each identified PCP associated with the Ethernet frame.

Example 10 includes the subject matter of any of Examples 1-9, and wherein the Ethernet gateway is further to map each identified PCP associated with the Ethernet frame to a corresponding one of the one or more outbound VLs.

Example 11 includes the subject matter of any of Examples 1-10, and wherein the HPC switch further includes a high-radix HPC switch chip, and wherein the Ethernet gateway is integrated on-die of the high-radix HPC switch chip.

Example 12 includes a method for Ethernet gateway congestion management in high-performance computing (HPC) architectures, the method comprising receiving, by an Ethernet gateway, an HPC packet from an HPC fabric via a virtual lane (VL) of the Ethernet gateway; determining, by the Ethernet gateway, whether the HPC packet corresponds to a backward error correction notification (BECN); identifying, by the Ethernet gateway and in response to a determination that the HPC packet corresponds to a BECN, one or more priority code points (PCPs) as a function of the VL on which the HPC packet was received; generating, by the Ethernet gateway, an Ethernet priority-based flow control (PFC) frame that includes the one or more identified PCPs in a header of the Ethernet PFC frame; and transmitting, by the Ethernet gateway, the Ethernet PFC frame to an Ethernet fabric as a function of the one or more identified PCPs.

Example 13 includes the subject matter of Example 12, and wherein determining whether the HPC packet indicates the HPC packet includes the BECN comprises checking a BECN bit in a header of the HPC packet.

Example 14 includes the subject matter of any of Examples 12 and 13, and further including determining, by the Ethernet gateway, whether the HPC packet corresponds to a forward error correction notification (FECN).

Example 15 includes the subject matter of any of Examples 12-14, and wherein determining whether the HPC packet indicates the HPC packet includes an FECN comprises checking an FECN bit in a header of the HPC packet.

Example 16 includes the subject matter of any of Examples 12-15, and further including transmitting, by the Ethernet gateway and in response to a determination that the HPC packet indicates the HPC packet corresponds to the FECN, another HPC packet which corresponds to another BECN on the VL on which the HPC packet that corresponds to the FECN was received.

Example 17 includes the subject matter of any of Examples 12-16, and further including updating, by the Ethernet gateway, a corresponding PCP field in the header of the Ethernet PFC frame based on the one or more identified PCPs.

Example 18 includes the subject matter of any of Examples 12-17, and further including decapsulating, by the Ethernet gateway, the received HPC packet into one or more decapsulated portions; and placing, by the Ethernet gateway, the one or more decapsulated portions of the received HPC packet into a VL queue associated with the VL on which the HPC packet was received.

Example 19 includes the subject matter of any of Examples 12-18, and further including passing, by the Ethernet gateway, the BECN to a flop associated with the VL; and updating, by the Ethernet gateway, a VL-to-PCP map entry associated with the VL as a function of the BECN, wherein identifying the one or more PCPs comprises identifying the one or more PCPs as a function of the updated VL-to-PCP map entry.

Example 20 includes the subject matter of any of Examples 12-19, and further including receiving, by the Ethernet gateway, an Ethernet frame from an Ethernet fabric; identifying, by the Ethernet gateway, one or more outbound VLs associated with the Ethernet frame; determining, by the Ethernet gateway, whether the Ethernet frame corresponds to a PFC packet; identifying each PCP associated with the Ethernet frame; and updating, by the Ethernet gateway and in response to a determination that the Ethernet frame corresponds to the PFC packet, a pause state of each PCP associated with the Ethernet frame.

Example 21 includes the subject matter of any of Examples 12-20, and further including mapping, by the Ethernet gateway, each PCP associated with the Ethernet frame to a corresponding one of the one or more outbound VLs.

Example 22 includes the subject matter of any of Examples 12-21, and wherein receiving the HPC packet from the HPC fabric by the Ethernet gateway comprises receiving the HPC packet at a high-radix HPC switch chip on which the Ethernet gateway is integrated on-die.

Example 23 includes one or more machine-readable storage media comprising a plurality of instructions stored thereon that, in response to being executed, cause a lightweight Ethernet gateway of a high-performance computing (HPC) switch to perform the method of any of Examples 12-22.

Example 24 includes a high-performance computing (HPC) switch comprising one or more processors; one or more memory devices having stored therein a plurality of instructions that, when executed by the one or more processors, cause a lightweight Ethernet gateway of the HPC switch to perform the method of any of Examples 12-22.

Example 25 includes a high-performance computing (HPC) switch for Ethernet gateway congestion management in HPC architectures, the HPC switch comprising Ethernet gateway circuitry to receive an HPC packet from an HPC fabric via a virtual lane (VL) of the Ethernet gateway; determine whether the HPC packet corresponds to a backward error correction notification (BECN); identify, in response to a determination that the HPC packet corresponds to a BECN, one or more priority code points (PCPs) as a function of the VL on which the HPC packet was received; generate an Ethernet priority-based flow control (PFC) frame that includes the one or more identified PCPs in a header of the Ethernet PFC frame; and transmit the Ethernet PFC frame to an Ethernet fabric as a function of the one or more identified PCPs.

Example 26 includes the subject matter of Example 25, and wherein to determine whether the HPC packet indicates the HPC packet corresponds to the BECN comprises to check a BECN bit in a header of the HPC packet.

Example 27 includes the subject matter of any of Examples 25 and 26, and wherein the Ethernet gateway circuitry is further to determine whether the HPC packet corresponds to a forward error correction notification (FECN).

Example 28 includes the subject matter of any of Examples 25-27, and wherein to determine whether the HPC packet indicates the HPC packet corresponds to the FECN comprises to check an FECN bit in a header of the HPC packet.

Example 29 includes the subject matter of any of Examples 25-28, and wherein the Ethernet gateway circuitry is further to transmit, in response to a determination that the HPC packet indicates the HPC packet corresponds to the FECN, another HPC packet which corresponds to another BECN on the VL on which the HPC packet that corresponds to the FECN was received.

Example 30 includes the subject matter of any of Examples 25-29, and wherein the Ethernet gateway circuitry is further to update a corresponding PCP field in the header of the Ethernet PFC frame based on the one or more identified PCPs.

Example 31 includes the subject matter of any of Examples 25-30, and wherein the Ethernet gateway circuitry is further to decapsulate the received HPC packet into one or more decapsulated portions; and place the one or more decapsulated portions of the received HPC packet into a VL queue associated with the VL on which the HPC packet was received.

Example 32 includes the subject matter of any of Examples 25-31, and wherein the Ethernet gateway circuitry is further to pass the BECN to a flop associated with the VL; and update a VL-to-PCP map entry associated with the VL as a function of the BECN, wherein to identify the one or more PCPs comprises to identify the one or more PCPs as a function of the updated VL-to-PCP map entry.

Example 33 includes the subject matter of any of Examples 25-32, and wherein the Ethernet gateway circuitry is further to receive an Ethernet frame from an Ethernet fabric; identify one or more outbound VLs associated with the Ethernet frame; determine whether the Ethernet frame corresponds to a PFC packet; identify each PCP associated with the Ethernet frame; and update, in response to a determination that the Ethernet frame corresponds to the PFC packet, a pause state of each identified PCP associated with the Ethernet frame.

Example 34 includes the subject matter of any of Examples 25-33, and wherein the Ethernet gateway circuitry is further to map each identified PCP associated with the Ethernet frame to a corresponding one of the one or more outbound VLs.

Example 35 includes the subject matter of any of Examples 25-34, and wherein the Ethernet gateway circuitry further includes a high-radix HPC switch chip, and wherein the Ethernet gateway circuitry is integrated on-die of the high-radix HPC switch chip.

Example 36 includes an Ethernet gateway for congestion management in high-performance computing (HPC) architectures, the Ethernet gateway comprising means for receiving an HPC packet from an HPC fabric via a virtual lane (VL) of the Ethernet gateway; means for determining whether the HPC packet corresponds to a backward error correction notification (BECN); means for identifying, in response to a determination that the HPC packet corresponds to a BECN, one or more priority code points (PCPs) as a function of the VL on which the HPC packet was received; means for generating an Ethernet priority-based flow control (PFC) frame that includes the one or more identified PCPs in a header of the Ethernet PFC frame; and means for transmitting the Ethernet PFC frame to an Ethernet fabric as a function of the one or more identified PCPs.

Example 37 includes the subject matter of Example 36, and wherein the means for determining whether the HPC packet indicates the HPC packet includes the BECN comprises means for checking a BECN bit in a header of the HPC packet.

Example 38 includes the subject matter of any of Examples 36 and 37, and further including means for determining whether the HPC packet corresponds to a forward error correction notification (FECN).

Example 39 includes the subject matter of any of Examples 36-38, and wherein the means for determining whether the HPC packet indicates the HPC packet includes an FECN comprises means for checking an FECN bit in a header of the HPC packet.

Example 40 includes the subject matter of any of Examples 36-39, and further including means for transmitting, in response to a determination that the HPC packet indicates the HPC packet corresponds to the FECN, another HPC packet which corresponds to another BECN on the VL on which the HPC packet that corresponds to the FECN was received.

Example 41 includes the subject matter of any of Examples 36-40, and further including means for updating a corresponding PCP field in the header of the Ethernet PFC frame based on the one or more identified PCPs.

Example 42 includes the subject matter of any of Examples 36-41, and further including means for decapsulating the received HPC packet into one or more decapsulated portions; and means for placing the one or more decapsulated portions of the received HPC packet into a VL queue associated with the VL on which the HPC packet was received.

Example 43 includes the subject matter of any of Examples 36-42, and further including means for passing the BECN to a flop associated with the VL; and means for updating a VL-to-PCP map entry associated with the VL as a function of the BECN, wherein the means for identifying the one or more PCPs comprises means for identifying the one or more PCPs as a function of the updated VL-to-PCP map entry.

Example 44 includes the subject matter of any of Examples 36-43, and further including means for receiving an Ethernet frame from an Ethernet fabric; means for identifying one or more outbound VLs associated with the Ethernet frame; means for determining whether the Ethernet frame corresponds to a PFC packet; means for identifying each PCP associated with the Ethernet frame; and means for updating, in response to a determination that the Ethernet frame corresponds to the PFC packet, a pause state of each PCP associated with the Ethernet frame.

Example 45 includes the subject matter of any of Examples 36-44, and further including means for mapping each PCP associated with the Ethernet frame to a corresponding one of the one or more outbound VLs.

Example 46 includes the subject matter of any of Examples 36-45, and wherein the means for receiving the HPC packet from the HPC fabric by the Ethernet gateway comprises means for receiving the HPC packet at a high-radix HPC switch chip on which the Ethernet gateway is integrated on-die.

The invention claimed is:

1. A high-performance computing (HPC) switch for Ethernet gateway congestion management in HPC architectures, the HPC switch comprising:
a compute engine; and
an Ethernet gateway to:
receive an HPC packet from an HPC fabric via a virtual lane (VL) of the Ethernet gateway;
determine whether the HPC packet corresponds to a backward error correction notification (BECN);
identify, in response to a determination that the HPC packet corresponds to a BECN, one or more priority code points (PCPs) as a function of the VL on which the HPC packet was received;
generate an Ethernet priority-based flow control (PFC) frame that includes the one or more identified PCPs in a header of the Ethernet PFC frame; and
transmit the Ethernet PFC frame to an Ethernet fabric as a function of the one or more identified PCPs.

2. The HPC switch of claim 1, wherein to determine whether the HPC packet corresponds to the BECN comprises to check a BECN bit in a header of the HPC packet.

3. The HPC switch of claim 1, wherein the Ethernet gateway is further to determine whether the HPC packet corresponds to a forward error correction notification (FECN), and wherein to determine whether the HPC packet corresponds to the FECN comprises to check an FECN bit in a header of the HPC packet.

4. The HPC switch of claim 1, wherein the Ethernet gateway is further to update a corresponding PCP field in the header of the Ethernet PFC frame based on the one or more identified PCPs.

5. The HPC switch of claim 1, wherein the Ethernet gateway is further to:
decapsulate the received HPC packet into one or more decapsulated portions; and
place the one or more decapsulated portions of the received HPC packet into a VL queue associated with the VL on which the HPC packet was received.

6. The HPC switch of claim 1, wherein the Ethernet gateway is further to:
pass the BECN to a flop associated with the VL; and
update a VL-to-PCP map entry associated with the VL as a function of the BECN, wherein to identify the one or more PCPs comprises to identify the one or more PCPs as a function of the updated VL-to-PCP map entry.

7. The HPC switch of claim 1, wherein the Ethernet gateway is further to:
receive an Ethernet frame from an Ethernet fabric;
identify one or more outbound VLs associated with the Ethernet frame;
determine whether the Ethernet frame corresponds to a PFC packet;
identify each PCP associated with the Ethernet frame; and
update, in response to a determination that the Ethernet frame corresponds to the PFC packet, a pause state of each identified PCP associated with the Ethernet frame.

8. The HPC switch of claim 1, wherein the HPC switch further includes a high-radix HPC switch chip, and wherein the Ethernet gateway is integrated on-die of the high-radix HPC switch chip.

9. The HPC switch of claim 3, wherein the Ethernet gateway is further to transmit, in response to a determination that the HPC packet corresponds to the FECN, another HPC packet which corresponds to another BECN on the VL on which the HPC packet that corresponds to the FECN was received.

10. The HPC switch of claim 7, wherein the Ethernet gateway is further to map each identified PCP associated with the Ethernet frame to a corresponding one of the one or more outbound VLs.

11. One or more non-transitory machine-readable storage media comprising a plurality of instructions stored thereon that, in response to being executed, cause an Ethernet gateway of an HPC switch to:
receive an HPC packet from an HPC fabric via a virtual lane (VL) of the Ethernet gateway;
determine whether the HPC packet corresponds to a backward error correction notification (BECN);
identify, in response to a determination that the HPC packet corresponds to a BECN, one or more priority code points (PCPs) as a function of the VL on which the HPC packet was received;
generate an Ethernet priority-based flow control (PFC) frame that includes the one or more identified PCPs in a header of the Ethernet PFC frame; and
transmit the Ethernet PFC frame to an Ethernet fabric as a function of the one or more identified PCPs.

12. The one or more non-transitory machine-readable storage media of claim 11, wherein to determine whether the HPC packet corresponds to the BECN comprises to check a BECN bit in a header of the HPC packet.

13. The one or more non-transitory machine-readable storage media of claim 11, wherein the plurality of instructions further cause the Ethernet gateway to determine whether the HPC packet corresponds to a forward error correction notification (FECN), and wherein to determine whether the HPC packet corresponds to the FECN comprises to check an FECN bit in a header of the HPC packet.

14. The one or more non-transitory machine-readable storage media of claim 11, wherein the plurality of instructions further cause the Ethernet gateway to update a corresponding PCP field in the header of the Ethernet PFC frame based on the one or more identified PCPs.

15. The one or more non-transitory machine-readable storage media of claim 11, wherein the plurality of instructions further cause the Ethernet gateway to:
decapsulate the received HPC packet into one or more decapsulated portions; and
place the one or more decapsulated portions of the received HPC packet into a VL queue associated with the VL on which the HPC packet was received.

16. The one or more non-transitory machine-readable storage media of claim 11, wherein the plurality of instructions further cause the Ethernet gateway to:
pass the BECN to a flop associated with the VL; and
update a VL-to-PCP map entry associated with the VL as a function of the BECN,
wherein to identify the one or more PCPs comprises to identify the one or more PCPs as a function of the updated VL-to-PCP map entry.

17. The one or more non-transitory machine-readable storage media of claim 11, wherein the plurality of instructions further cause the Ethernet gateway to:
receive an Ethernet frame from an Ethernet fabric;
identify one or more outbound VLs associated with the Ethernet frame;
determine whether the Ethernet frame corresponds to a PFC packet;
identify each PCP associated with the Ethernet frame; and
update, in response to a determination that the Ethernet frame corresponds to the PFC packet, a pause state of each identified PCP associated with the Ethernet frame.

18. The one or more non-transitory machine-readable storage media of claim 11, wherein the HPC switch further includes a high-radix HPC switch chip, and wherein the Ethernet gateway is integrated on-die of the high-radix HPC switch chip.

19. The one or more non-transitory machine-readable storage media of claim 13, wherein the plurality of instructions further cause the Ethernet gateway to transmit, in response to a determination that the HPC packet corresponds to the FECN, another HPC packet which corresponds to another BECN on the VL on which the HPC packet that corresponds to the FECN was received.

20. The one or more non-transitory machine-readable storage media of claim 17, wherein the plurality of instructions further cause the Ethernet gateway to map each identified PCP associated with the Ethernet frame to a corresponding one of the one or more outbound VLs.

21. An Ethernet gateway for congestion management in high-performance computing (HPC) architectures, the Ethernet gateway comprising:
means for receiving an HPC packet from an HPC fabric via a virtual lane (VL) of the Ethernet gateway;
means for determining whether the HPC packet includes to a backward error correction notification (BECN);
means for identifying, in response to a determination that the HPC packet corresponds to a BECN, one or more priority code points (PCPs) as a function of the VL on which the HPC packet was received;
means for generating an Ethernet priority-based flow control (PFC) frame that includes the one or more identified PCPs in a header of the Ethernet PFC frame; and
means for transmitting the Ethernet PFC frame to an Ethernet fabric as a function of the one or more identified PCPs.

22. The Ethernet gateway of claim 21, wherein the means for determining whether the HPC packet includes the BECN comprises means for checking a BECN bit in a header of the HPC packet.

23. The Ethernet gateway of claim 21, further comprising means for determining whether the HPC packet corresponds to a forward error correction notification (FECN), and wherein the means for determining whether the HPC packet includes an FECN comprises means for checking an FECN bit in a header of the HPC packet.

24. The Ethernet gateway of claim 23, further comprising means for transmitting, in response to a determination that the HPC packet corresponds to the FECN, another HPC packet which corresponds to another BECN on the VL on which the HPC packet that corresponds to the FECN was received.

25. The Ethernet gateway of claim 23, further comprising:
means for receiving an Ethernet frame from an Ethernet fabric;
means for identifying one or more outbound VLs associated with the Ethernet frame;
means for determining whether the Ethernet frame corresponds to a PFC packet;
means for updating, in response to a determination that the Ethernet frame corresponds to the PFC packet, a pause state of each PCP associated with the Ethernet frame; and
means for mapping each PCP associated with the Ethernet frame to a corresponding one of the one or more outbound VLs.

\* \* \* \* \*